Figure 1:
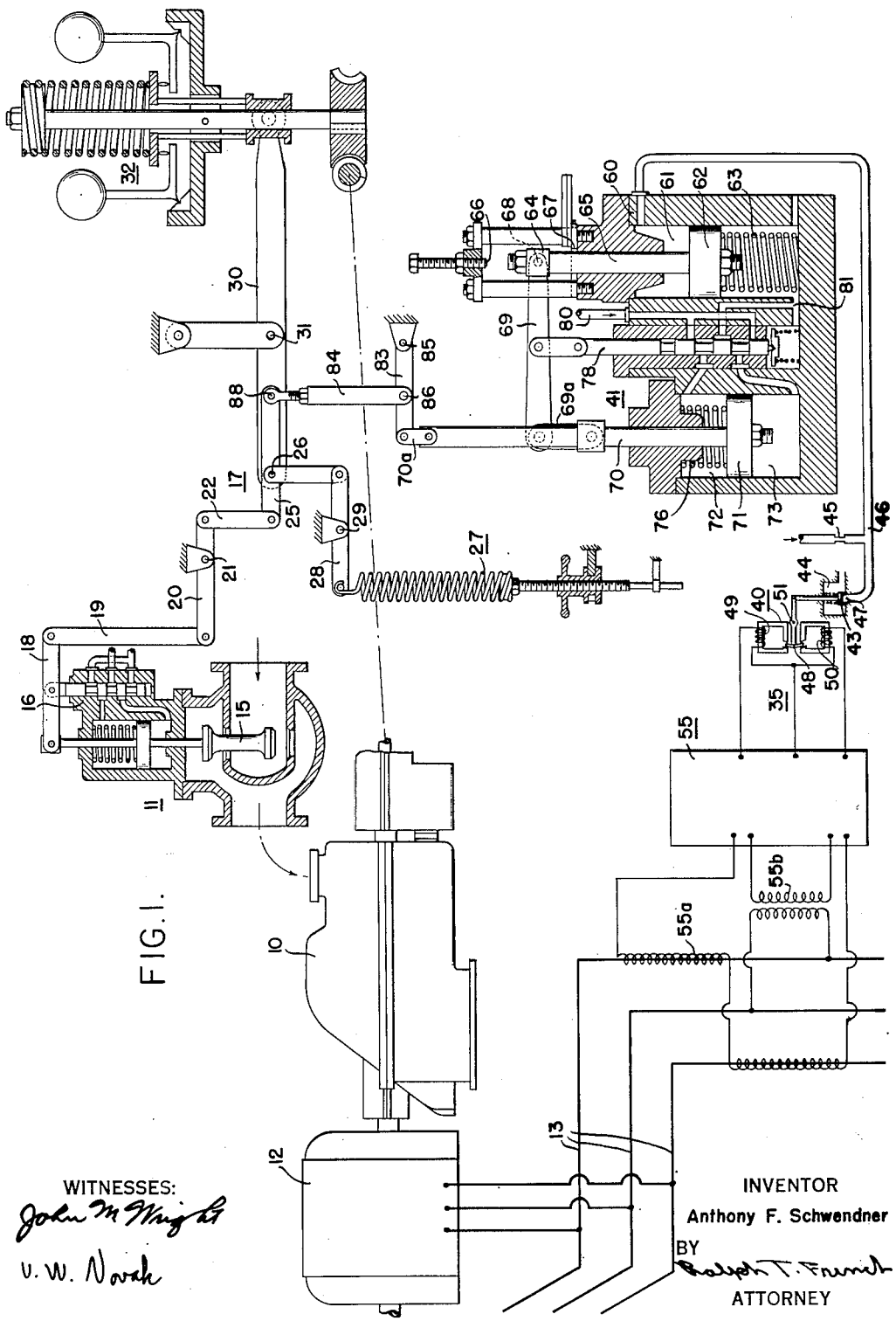

Dec. 9, 1952  A. F. SCHWENDNER  2,621,301
GOVERNING APPARATUS
Filed April 27, 1951  2 SHEETS—SHEET 1

WITNESSES:
John M. Wright
V. W. Novak

INVENTOR
Anthony F. Schwendner
BY
Ralph T. French
ATTORNEY

Dec. 9, 1952 A. F. SCHWENDNER 2,621,301
GOVERNING APPARATUS

Filed April 27, 1951 2 SHEETS—SHEET 2

WITNESSES:
John M. Wright
U. W. Novak

INVENTOR
Anthony F. Schwendner
BY Ralph T. French
ATTORNEY

Patented Dec. 9, 1952

2,621,301

UNITED STATES PATENT OFFICE 2,621,301

GOVERNING APPARATUS

Anthony F. Schwendner, Ridley Park, Pa., assignor to Westinghouse Electric Corporation, East Pittsburgh, Pa., a corporation of Pennsylvania Application April 27, 1951, Serial No. 223,220

7 Claims. (Cl. 290—4)

This invention relates to power plant governing and regulating apparatus, and more particularly to load-responsive regulating apparatus for turbine-driven generator equipment for delivering electric power to a tie line system subject to fluctuating load conditions.

Tie line load regulators have heretofore been used in power systems where severe local oscillations in load are apt to be encountered. Such apparatus has been used, for example, where load changes in an industrial installation can readily be taken in the consumer's own power plant, or where a selected generating plant in a central station system is adapted to absorb load oscillations. In an alternating current system adapted for supplying power to the plant of an industrial consumer where a generator is locally connected to the system through a tie line, it may thus be desirable to provide means to facilitate the taking up of such load oscillations in the consumer's plant.

Under conditions met in actual service, particularly when it is desired to provide improved load regulation for a tie line system that includes existing generating equipment of relatively early design, it may be difficult to ensure the rapid response to load changes necessary for maintenance of favorable frequency or other system characteristics. It will be understood that the oscillating load must be metered and then added or subtracted from the load carried by the local generating unit. The smaller the total time lag between the measurement of the load change and corresponding load adjustment at the local generating unit, the smaller will be any portion of the load tending to escape through the tie lines to cause undesirable frequency changes. It is an object of the present invention to provide improved load control means operative to ensure rapid load corrective response for obviating any of the difficulties heretofore experienced.

A method of load regulation heretofore generally employed has involved controlling load on the generating unit through the medium of the usual speed changer associated with the governor of the driving turbine. The response to load changes is slow, however, when the speed changer is thus utilized. It is another object, therefore, to provide improved means for effecting rapid regulation of an existing turbine and generator plant, in accordance with line load, without necessitating adjustment of the speed changer.

It is desirable to limit the load picked up by a local generating unit in accordance with the rating of the unit and of its supplying boilers. Another object of the invention, therefore, is to provide improved regulator means having the foregoing features of operation, and further constructed and arranged to avoid any adverse effect on the control of the existing speed-responsive governor over the turbine admission valves, as in case of a sudden load dump.

A further object is the provision of improved turbine regulator apparatus adapted for quick response to line load fluctuations, and employable with any existing generating unit regardless of age or the type of governing system used.

Features of the invention comprise the modification of the governing levers and linkage, through which the usual speed governor is normally connected directly to the governing valve servo-mechanism, to accommodate an additional line load-responsive regulator apparatus, so that position of the turbine governing valves can be controlled jointly by the governor and regulator.

Figure 2:
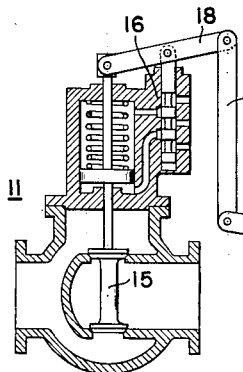
Figure 2:
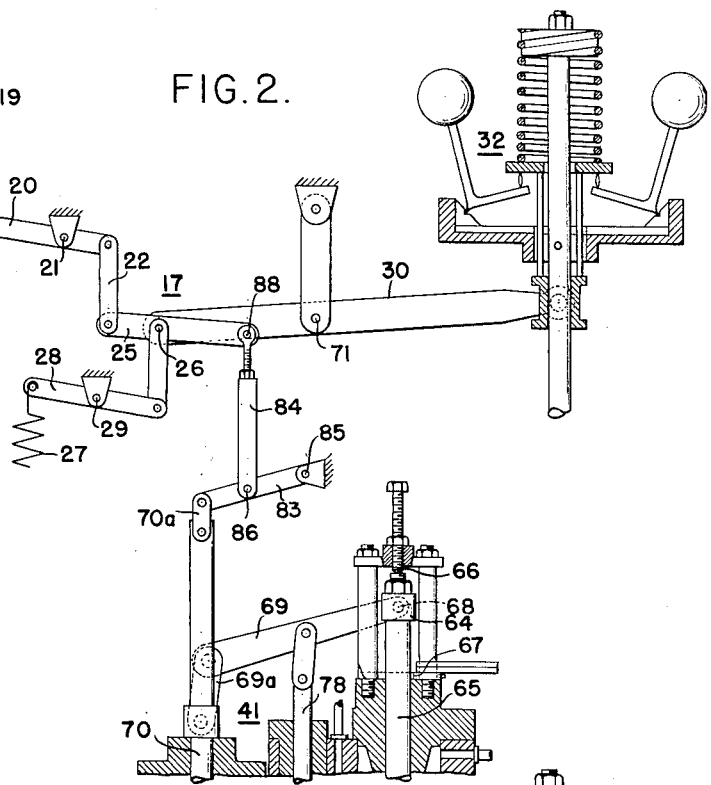
Figure 3:
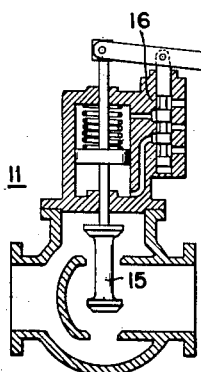
Figure 3:
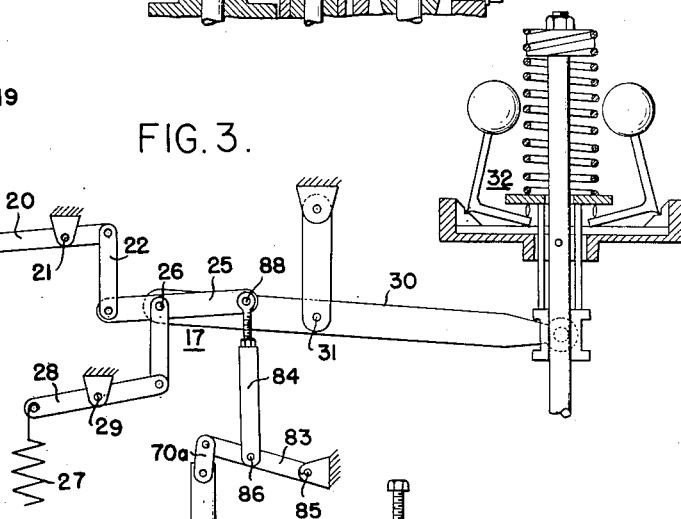

These and other objects are effected by the invention as will be apparent from the following description and claims taken in connection with the accompanying drawings, forming a part of this application, in which:

Fig. 1 is a schematic view of typical turbo-generating equipment, sectioned in part, having control apparatus constructed in accordance with the invention; and Figs. 2 and 3 are fragmentary diagrammatic views illustrating different operating positions of the apparatus shown in Fig. 1.

As shown in Fig. 1 of the drawings, a turbine 10 having a steam admission valve device 11 is provided for driving a generator, in this case an alternator 12, which is adapted to feed electric power into a tie line 13 that forms part of a main power supply system. The admission valve device 11 includes a valve element 15 and a fluid pressure actuated governing valve servo-mechanism 16 for actuating the valve element in accordance with operation of a linkage system generally indicated at 17 and including a servo lever 18. The servo-mechanism will be recognized as a well-known type operative to provide sufficiently amplified force to position the valve 15 in accordance with movement of linkage 17, and may be supplied with motivating oil under pressure from any suitable source (not shown). The outer end of the servo lever 18 is adapted to be lifted upwardly for causing movement of the valve element 15 toward closed position, and vice versa, and is operatively connected by a link 19 to one end of a lever 20, which is fulcrumed intermediate its ends at 21 and has the other end pivotally connected to a link 22. Substantially paralleling lever 20 is a floating lever 25, one end of which is pivotally connected to the link 22. A central pin 26 carried by the lever 25 is connected to a speed changer 27 through the medium of the lever 28 that is fulcrumed intermediate its ends at 29. The central pin 26 of the lever 25 is also pivotally connected to one end of a governor lever 30, which is fulcrumed at 31 and has its opposite end operatively connected to a turbine driven speed-responsive fly-ball governor device 32. It will readily be understood that, under ordinary circumstances, an increase in turbine speed will effect centrifugal operation of the flyball governor device 32 and the associated linkage system 17, including levers 30, 28, 20 and 18, to cause the admission valve device 11 to reduce the supply of steam to the turbine. Conversely, a reduction in speed will actuate linkage system 17 to cause the governor device 32 to effect operation of the admission valve devices to increase the steam flow.

According to the invention, electro-hydraulic tie line load regulator apparatus, generally indicated at 35, is provided for cooperation with the speed-responsive governor device 32, through the medium of the linkage system 17 just described, to control operation of the admission valve 11 of the turbine 10. The circuit arrangements and electrical characteristics of the tie line load regulator apparatus 35 may be similar to the invention disclosed in the copending application of Seymour W. Herwald and Harold M. Watson, Serial No. 213,726, filed March 3, 1951, and assigned to the assignee of the present application. As illustrated diagrammatically in Fig. 1, the regulator apparatus comprises a line load-responsive, electro-magnetically actuated control valve device 40 which may have a construction such as that disclosed in Patent No. 2,512,154, issued June 20, 1950, to Herwald et al. and assigned to the same assignee as this application, and a fluid pressure controlled load regulator servo-mechanism 41, which is constructed and arranged to respond to a control pressure established by the control valve device 40 in accordance with fluctuations in tie line load.

The control valve device 40, shown diagrammatically, comprises a cup valve element 43 disposed in a chamber 44 through which oil or other fluid under pressure is supplied, by way of an orifice 45, a control pipe 46, and an escape port 47, from a suitable source (not shown). The cup valve 43 cooperates with the escape port 47 for variably restricting the flow area thereof, thereby operating to control the magnitude of fluid pressure in the control pipe 46. Thus, with the cup valve 43 urged by a biasing force against the pressure of fluid flowing through escape port 47 from the control pipe 46 and tending to push the cup valve away from its seat, the back pressure in the control pipe thus built up will correspond to the biasing force. This biasing force is maintained by operation of a solenoid relay device having a pivotally mounted armature member 48, and opposed electro-magnet coils 49 and 50 for actuating the armature member about its fulcrum pin 51 in accordance with relative energization of the coils. The coils 49 and 50 may be connected to a load-responsive amplifier circuit generally indicated at 55, which includes suitable current and potential transformer windings 55a and 55b associated with the power line 13, the circuit 55 being adapted to measure fluctuations in the line load and to impress a resultant input on the respective coils 49 and 50 for actuating the armature 48 and cup valve element 43 to balance the coil input and the cup valve pressure which will correspond to the line load. Preferably, the solenoid-operated cup valve element 43 is arranged to effect a corresponding increase in fluid pressure in control pipe 46 in response to a reduction in the line load, and conversely, to effect a reduction in control pipe pressure upon an increase in load.

The regulator servo-mechanism 41 comprises casing structure 60 having formed therein a piston chamber 61 which communicates with the control pipe 46 and contains a pilot piston 62 that is subject to the opposing pressures of fluid in the piston chamber and of a spring 63. The pilot piston 62 has a piston rod 65, the upper end 64 of which is movable between upper and lower stops 66 and 67, and which carries a pin 68 to which is pivoted one end of a lever 69. The opposite end of lever 69 is operatively connected through the medium of a link 69a to a piston rod 70 of a power piston 71, which is interposed between upper and lower chambers 72 and 73. A spring 76 is interposed between the piston 71 and a wall of the upper chamber 72 for biasing the piston downwardly. Operatively connected to lever 69, intermediate the ends thereof, is the stem of a pilot valve 78. As is evident from the drawing, the pilot valve 78 is arranged to supply and release motivating fluid under pressure to and from the respective chambers 72 and 73 in accordance with operation of the lever 69 by piston 62, the follow-up motion of power piston 71 being effective to lap the valve ports in the well-known manner. Fluid under pressure may be supplied from a suitable source (not shown) by way of a conduit 80, and discharged by way of a passage 81.

According to the invention, the servo-mechanism power piston 71 and stem 70 are pivotally connected by a link 70a to the linkage mechanism 17, through the medium of a lever 83 and adjustable rod 84. The end of the lever 83 opposite that pivoted to rod 70 is connected to a stationary fulcrum pin 85, while a central pin 86 carried by the lever is pivotally connnected to the lower end of the rod 84. The upper end of rod 84 is, in turn, pivotally connected to a pin 88 that is carried by the end of lever 25 opposite that connected to link 22.

In operation, the governor mechanism 32 will at all times remain effective to control the admission valve device 11 in accordance with the individual load characteristics of the turbine 10, as indicated by the speed thereof, in the usual well-known manner. On the other hand, a sudden change in the line load, measured by the line load metering circuits 55 and other elements of the apparatus indicated generally at 35, as already described, will cause a corresponding variation in fluid pressure in control pipe 46 to effect operation of the regulator servo-mechanism 41 to actuate the linkage system 17 for adjusting the position of the admission valve device 11, within a predetermined range, substantially independently of governor 32.

As shown in Fig. 1, the adjustable stops 66 and 67 are adapted to be set as desired for limiting travel of the piston 62 of the line load regulator apparatus 41, so that the apparatus will be effective to control only that movement of the admission valve device 11 which determines the selected range of turbine loading, or from full load to about three-fourths full load, for example. By way of further example, with a turbine rated at 25,000 kw., the stop 67 may be set to permit closing operation of the admission valve device 11 by the line load-responsive regulator apparatus 41 to reduce the turbine loading through an 8,000 kw. range to 17,000 kw., with the governor set to maximum load position. The load-responsive regulator will be capable of reducing the load carried by the governor in any load position by 8,000 kw., except when the governor load is set at points below 8,000 kw. Such limitation of the range of movement of the linkage 17 by the line load regulator apparatus 41 will thus ensure retention by the governor mechanism 32 of its usual load dumping characteristics. The load range, as determined by the setting of stop 67, can be changed while the unit is in operation.

Thus, as best shown in Fig. 2, the governor device 32 is maintained fully operative to effect load dump regardless of the load indicated by the line load regulator apparatus 41. In this view the regulator apparatus 41 is disposed in maximum load position, while the turbine admission valve device 11 is nevertheless actuated to the closed position, due to operation of the governor device 32 to its load dump position in response to speed. The usual turbine protective features normally provided by the governor 32 are, therefore, still available.

As best shown in Fig. 3, the line load regulator apparatus 41 is operative to effect movement of the admission valve device 11 to a partial load position by operation of linkage mechanism 17, despite the fact that the governor mechanism 32 may be positioned to call for full load operation of the turbine, as is illustrated diagrammatically in this view.

Summarizing, it will be seen from the foregoing that the turbine load controlling equipment constructed in accordance with the invention will serve to satisfy the control requirements to be met to ensure adequate governing of a local generating unit of any existing type in cooperation with a tie line system. The invention provides a means for altering existing admission valve and governor linkages to accommodate interlocking control thereof by suitable additional line load-responsive regulator means, as just described. In order to avoid interference with the load dumping characteristics of the usual governor, the additional regulator means is so adjusted as to permit the governor to open the turbine admission valve or valves fully when the tie line load regulator is in its maximum load demand position. Such a position of the tie line load regulator might be taken in case of failure of supply current to regulator apparatus 35, or of the controlling oil pressure.

When the line load regulator starts to operate, it is adapted to reduce load first within the predetermined limits of travel of its pilot piston. As hereinbefore explained, the operation of the regulator depends upon a control fluid pressure as maintained by operation of the solenoid-operated cup valve device, in response to electrical input to the solenoid by suitable line power metering circuit means. Thus the regulator is almost instantaneously responsive to line load changes, and is adapted to control turbine load, through a predetermined range, regardless of the load setting of the governor.

While the invention has been shown in but one form, it will be obvious to those skilled in the art that it is not so limited, but is susceptible of various changes and modifications without departing from the spirit thereof.

What is claimed is:

1. In combination with a turbine driving a generator to deliver power to a line subject to load oscillations, governor valve means for controlling the supply of motive fluid to the turbine and including a valve operator element movable through a range of positions from no load to full load, speed-responsive governor mechanism driven by said turbine, load regulator apparatus including means for measuring the load in the line and a load-responsive servo-mechanism movable thereby in accordance with variations in load, common linkage system means operatively connecting said valve operator element to both said speed-responsive governor mechanism and said load-responsive servo-mechanism, and adjustable stop means cooperative with the line load regulator apparatus for limiting operation of the load-responsive member thereof to correspond with only a predetermined portion of the total range of positions of the valve operator element beginning with the full load position of the latter, the speed-responsive governor mechanism being adapted to retail control of said valve operator element throughout its entire range of positions from full load to no load with the load-responsive member in its maximum load position.

2. In combination with a turbine driving a generator to deliver power to a line subject to load oscillations, governor valve means for controlling the supply of motive fluid to the turbine and including a valve operator element movable through a range of positions from no load to full load, speed-responsive governor mechanism driven by said turbine, load regulator apparatus including means for measuring the load in the line and a load-responsive servo-mechanism movable thereby in accordance with variations in load, common linkage system means operatively connecting said valve operator element to both said speed-responsive governor mechanism and said load-responsive servo-mechanism, and adjustable stop means cooperative with the line load regulator apparatus for limiting operation of the load-responsive member thereof to correspond with only a predetermined portion of the total range of positions of the valve operator element beginning with the full load position of the latter, the speed-responsive governor mechanism being adapted to retain control of said valve operator element to effect closing of said governor valve means upon load dump.

3. In combination with a turbine driving a generator to deliver power to a line subject to load oscillations, governor valve means for controlling the supply of motive fluid to the turbine and including a valve operator element movable through a range of positions from no load to full load, speed-responsive governor mechanism driven by said turbine, load regulator apparatus including means for measuring the load in the line and a load-responsive servo-mechanism movable thereby in accordance with variations in load, common linkage system means operatively connecting said valve operator element to both said speed-responsive governor mechanism and said load-responsive servo-mechanism, and adjustable stop means cooperative with the load regulator apparatus for limiting movement of the load-responsive member to change only a part of the total load carrying ability of the turbine, said load regulator apparatus being adapted for changing that limited amount through the total load range of the speed-responsive governing mechanism down to the load equaling that of the limit of load regulator movement.

4. In combination, an alternating current system, an alternator connected to said system, a prime mover for driving said alternator, motive fluid admission valve means, speed-responsive governor means, regulator means responsive to fluctuations in load, said speed and load-responsive means jointly and severally controlling said valve means, means restricting said load-responsive means to control of the valve means through only part of its range, said speed-responsive means being so correlated with the load-responsive means that the latter has to be in its maximum load demand condition to enable the former to bring the valve means to its full open position.

5. In combination, an alternating current system, an alternator connected to said system, a turbine for driving said alternator, fluid admission valve means controlling supply of motive fluid to said turbine, speed-responsive governor mechanism driven by said turbine, a system of levers operatively connected to said governor mechanism and to said valve means for effecting movement of the latter through a range of positions from no load through partial load to full load, regulator means responsive to local fluctuations in load for jointly controlling said valve means, said regulator means comprising electro-responsive apparatus connected to said system for measuring local changes in load, fluid pressure transforming means cooperative with said electro-responsive apparatus to maintain a control pressure corresponding at all times to the load measured by said apparatus, a fluid pressure servo-mechanism operative in accordance with said control pressure, and linkage means operatively connecting said servo-mechanism to said system of levers for controlling movement of said admission valve means of the turbine to positions within a range limited to a predetermined load change.

6. Apparatus as set forth in claim 5 characterized in that the regulator means is connected to the turbine admission valve means through the medium of linkage means including stops for limiting movement thereof to operation causing resultant valve movement to positions within a range corresponding to a fixed load change.

7. In power plant apparatus including a generator connected to an alternating current system subject to fluctuating load, a prime mover for driving the generator, and motive fluid admission valve means including a controlling element movable through a range of positions from a full load position to a no load position in controlling the supply of motive fluid to said prime mover, the combination of a flyball governor device driven by said prime mover for effecting a full range of movement of said valve controlling element of the valve means in accordance with the speed of the prime mover, and electro-responsive regulator means operative in accordance with local variations in load occurring in said system for effecting movement of said controlling element of the valve means from said full load position to an intermediate position irrespective of operation of said flyball governor device.

ANTHONY F. SCHWENDNER.

REFERENCES CITED

The following references are of record in the file of this patent:

UNITED STATES PATENTS

| Number | Name | Date |
|---|---|---|
| Re. 17,161 | Innes | Dec. 11, 1928 |
| 1,110,799 | Kramer | Sept. 15, 1914 |
| 1,779,419 | Bryant | Oct. 28, 1930 |
| 1,792,241 | Ray | Feb. 10, 1931 |
| 1,950,594 | Bryant | Mar. 13, 1934 |
| 2,020,080 | Rosch | Nov. 5, 1935 |
| 2,512,154 | Herwald et al. | June 20, 1950 |